United States Patent [19]
Reitter et al.

[11] 3,736,807
[45] June 5, 1973

[54] TILTING DRIVE FOR CONVERTERS

[75] Inventors: Günther Reitter, Linz; Ernst Riegler, Enns, both of Austria

[73] Assignee: Vereinigte Osterreichische Eisen- und Stahlwerke Aktiengesellschaft, Linz

[22] Filed: Mar. 26, 1971

[21] Appl. No.: 128,414

[30] Foreign Application Priority Data

June 10, 1970 Austria................................A 5208/70

[52] U.S. Cl..................................................74/410
[51] Int. Cl..............................................F16h 57/00
[58] Field of Search.........................................74/410

[56] References Cited
UNITED STATES PATENTS

| | | | |
|---|---|---|---|
| 3,146,629 | 9/1964 | Schmitter | 74/410 |
| 3,299,729 | 1/1967 | Durand | 74/410 X |
| 3,388,608 | 6/1968 | Durand | 74/410 |
| 3,397,591 | 8/1968 | Delescluse | 74/410 |
| 3,548,678 | 12/1970 | Phillips | 74/410 X |

*Primary Examiner*—Arthur T. McKeon
*Attorney*—Brumbaugh, Graves, Donohue & Raymond

[57] ABSTRACT

The invention relates to a tilting drive for converters comprising a gear wheel fixed to a converter tilting trunnion and a pinion carrier suspended on said tilting trunnion to swing in pendulum fashion and supporting at least one driving pinion, said pinion carrier being resiliently supported in relation to a foundation by a torque support comprising a linkage rod, a lever producing a torsional moment and a torsional rod, wherein the improvement resides in at least one of the following features, i.e.
  a. that for fixing said torsional rod a bearing block is provided which is axially displaceable relative to the torsional rod so that the effective length of the torsional rod may be changed; and
  b. that the effective lever length of the lever producing the torsional moment is adjustable. This torque support is provided with great elasticity towards shocks. It is possible to change the spring constant and/or the spring damping so that the torque moment may correctly and optimally be adjusted to the operational conditions. The wobble movements of the converter do not cause changes of the spring resistance of the torque support.

8 Claims, 7 Drawing Figures

PATENTED JUN 5 1973 3,736,807

INVENTOR.
GÜNTHER REITTER
ERNST RIEGLER
BY Brumbaugh, Graves,
Donohue & Raymond
his ATTORNEYS

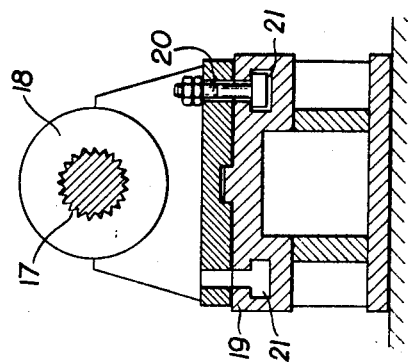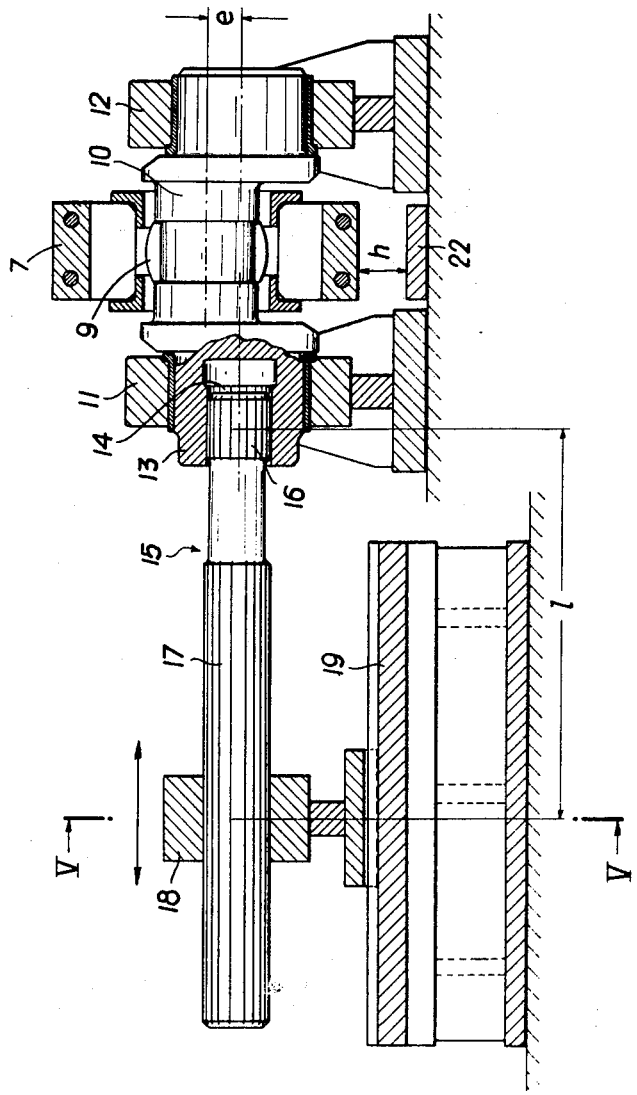

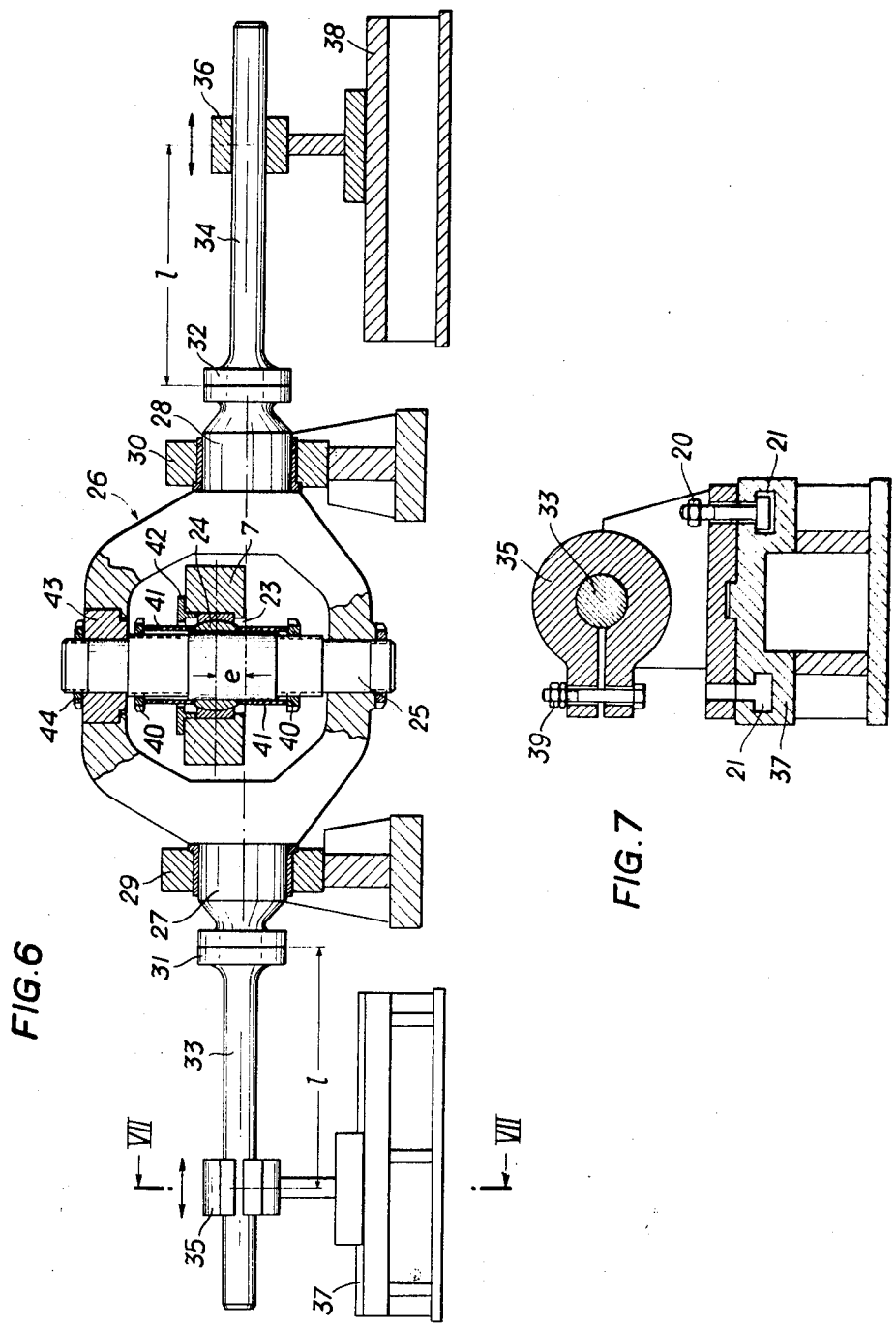

TILTING DRIVE FOR CONVERTERS

The invention relates to a tilting drive for converters comprising a gear wheel fixed to the tilting trunnion and a pinion carrier suspended on the tilting trunnion to swing in pendulum fashion and supporting at least one driving pinion, the pinion carrier being resiliently supported by a torque support comprising a linkage rod, a lever producing a torsional moment and a torsional rod. Such tilting drives may follow position changes of the tilting trunnion due to its bending through so that in any case a reliable meshing of the gear is guaranteed. The torque support connecting the pinion carrier with a fixed point has to guarantee maximum freedom of movement of the pinion carrier so that the pinion carrier may follow the wobble movements of the tilting trunnion which are transmitted onto it and which are caused when the tilting trunnion deflected under the action of the static and thermal stresses rotates.

A further demand which is placed in such torque supports is a certain elasticity towards shocks from the drive or load side which occur by acceleration and retardation in connection with the load change and as a result of a power transmission via a play from the converter to the carrying ring surrounding it or to the gear; the torque support is to be resiliently supported in peripheral direction.

Various spring-biased torque supports have become known. According to such a proposal the pinion is arranged in a rotatory pinion frame which by means of rollers is arranged to be rotatable on the broadened rims of the driven gear wheel fixed to the tilting trunnion and supported in peripheral direction by hydraulic or pneumatic shock absorbers. However, such shock absorbers are not resistent to continuous stresses and hardly suitable for use in converter plants.

According to another construction a tilting drive arranged at the tilting trunnion of converters is supported by a torque support which is to a degree resiliently supported on one end by interposition of spring elements, such as cup springs, rubber buffers or the like. Such torque supports have, however, the disadvantage, that the spring elements because of the desired short spring paths have to be designed in great dimensions and heavily and also they have to be greatly pre-stressed; a shock free support is therefore not possible. When annular springs are used as spring elements there is the danger that the conical faying faces seize so that the spring effect is lost.

Finally a tilting drive is known which is pushed onto the converter trunnion and is provided with several pinions which drive is supported in peripheral direction by an elastic torque support comprising linkage rods, levers and a torisonal rod. On either side of the gear case or pinion carrier, respectively, a vertical linkage rod is fixed which is articulated with the other end to a lever. These levers, in turn, are connected to be stiff against torsion with the ends of a horizontally arranged torsion rod which is mounted to be rotatory. The levers include with the linkage rods an angle of 90°. When a torque occurs the forces which are created in the linkage rods act against each other and twist the torsional rod. When the gear follows the wobble movement of the tilting trunnion, both linkage rods are moved in the same direction and the torsional rod is not twisted. However, in this arrangement the effective lever length of the levers is changed so that a torque moment occuring at the same time causes a changed torsional moment in the torsional rod; the lever arms thus have to balance the wobble movement of the gear and at the same time transmit the spring movements. Thus not overseeable conditions are caused as regards the stress on the torsional rod. A further disadvantage lies in that the length of the lever arms must be chosen so great that they do not get into the stretched position of linkage rods and levers when the tilting trunnion undergoes extreme position changes so that the resilient torque support would, at least in part, be lost. Furthermore the length of the torsional rod is highly dependent on the diameter of the gear and therefore cannot be freely chosen.

All known spring biased torque supports have the disadvantage in common that after the converter plant has started operation the spring constant and the spring damping can no longer be corrected. In converter plants it is possible as is well known, that during the blowing process oscillations, in particular oscillations of the metal bath occur, whose violence and frequency cannot be ascertained by calculation. Therefore it is desirable to change the spring constant and/or the spring damping so that the torque support may correctly and optimally be adjusted to the operational conditions without having to build out parts thereof or effecting time consuming re-constructions. Finally, the wobble movements of the converter should not cause any changes of the spring resistance of the torque support.

These aims of the invention are achieved while avoiding the disadvantages mentioned by a tilting drive of the kind defined in the introduction with at least one of the following features:

a. that for fixing the torsional rod a bearing block is provided which is axially displaceable relative to the torsional rod so that the effective length of the torsional rod may be changed; and b. that the effective lever length of the lever producing the torsional moment is adjustable.

The torsional rod is suitably provided over at least part of its length with a spline shaft or notch toothing, the bearing block serving for fixing the torsional rod being provided with a corresponding internal toothing.

Furthermore, the torsional rod is suitably provided at one end with a further spline shaft or notch toothing for engagement with a corresponding toothing in a bore of a pin provided on the lever which connects the linkage rod and the torsional rod so that a connection may be formed which is rigid against rotation and may be released.

According to a preferred embodiment the lever connecting the linkage rod and the torsional rod forms part of a crankshaft which is connected with the linkage rod by a ball joint bearing.

Below the crankshaft, at a distance from the linkage rod, a supporting plate may be provided, the distance being equal to or twice as big as the maximal effective lever length of the crankshaft; preferably the distance is 1.5 times the effective lever length of the crankshaft.

According to another embodiment of the invention the lever connecting the linkage rod and the torsional rod forms part of a yoke which is penetrated by a bolt on which a ball joint bearing is mounted which is connected with the linkage rod and displaceable in axial direction of the bolt, the plane laid through the yoke, the bolt and the torsional rod being perpendicular to the axis of the linkage rod.

In both embodiments the effective length of the lever connecting the linkage rod and the torsional rod is adjustable to such a value that the produced torsional moment is greater than the sum total of all bearing frictional moments in the torque support.

In order that the invention may be more fully understood two embodiments thereof shall now be explained with reference to the accompanying drawings.

FIGS. 1 to 5 illustrate the first embodiment and FIGS. 6 and 7 illustrate the second embodiment;

FIG. 1 shows a lateral view of a tilting drive with a resiliently mounted torque support;

FIG. 2 is a vertical sectional view along line II—II of FIG. 1, and and FIG. 3 is a ground plan of the tilting drive according to FIG. 1.

Figure 3:
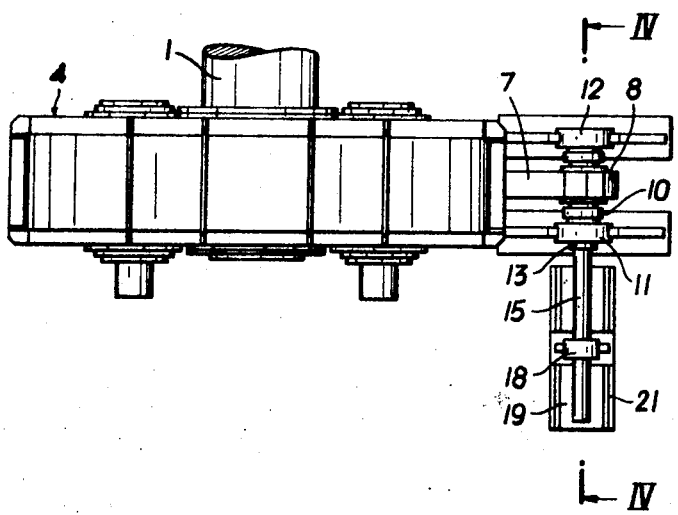

In FIG. 4 and 5 details of the torque support are shown:

FIG. 4 is a vertical sectional view along line IV—IV of FIG. 3 on an enlarged scale, and FIG. 5 is a vertical sectional view along line V—V of FIG. 4.

FIG. 6 shows partly in section details of the lever connecting the linkage rod and two torsional rods as provided in the second embodiment.

FIG. 7 is a vertical sectional view along line VII—VII of FIG. 6.

Figure 1:
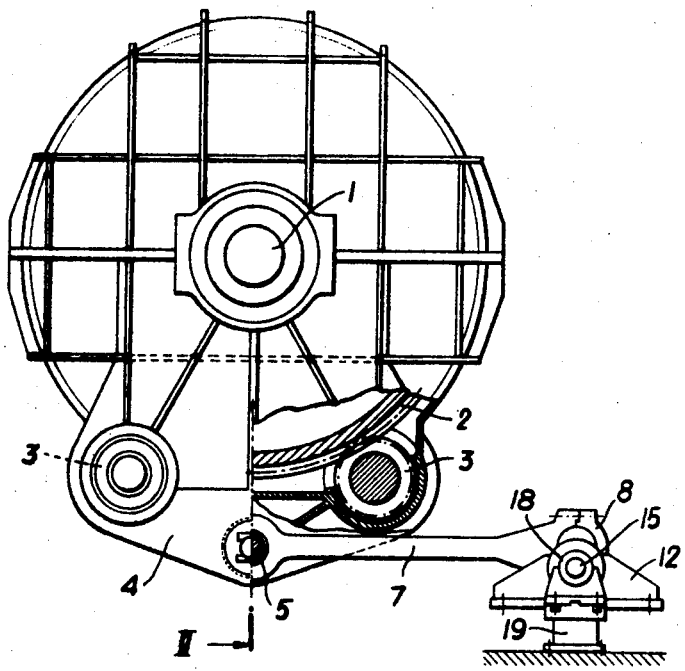
Figure 2:
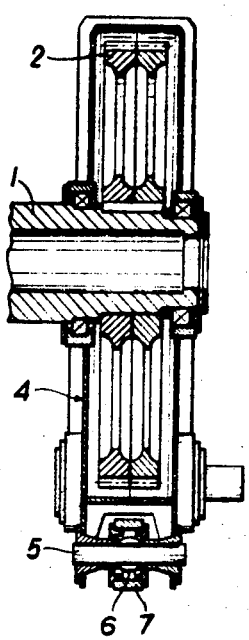

In FIGS. 1, 2 and 3 numeral 1 denotes the tilting trunnion of the converter and numeral 2 denotes a gear wheel arranged on said trunnion; the gear wheel may be driven by means of two pinions 3. The pinions 3 are mounted in a pinion carrier 4 surrounding the gear wheel 2; the pinion carrier is suspended on the tilting trunnion 1 so as to swing in pendulum fashion. One end of the linkage rod 7 of the torque support is articulated to the pinion carrier 4 by means of a bolt 5 and a ball joint bearing 6 surrounding the bolt. The other end of the linkage rod 7 is provided with an eye with a releasable strap 8 to surround a further ball joint bearing 9 which is arranged on a crankshaft 10 (FIG. 4). The crankshaft is mounted in the bearing blocks 11, 12. A crankshaft pin 13 is provided with a bore 14 with a spline shaft or notch toothing. Into the bore 14 a torsional rod 15 is inserted; the end of said rod is provided with a spline shaft or notch toothing 16 corresponding to that of the bore 14 of the crankshaft pin 13 so as to provide a connection between the torsional rod 15 and the crankshaft 10 which is fixed against rotation and releasable. On the other end the torsional rod 15 is provided with a further spline shaft or notch toothing 17 which engages with a corresponding inner toothing of a bearing block 18 which is displaceable in the direction of the arrow (FIG. 4). The bearing block 18 is releasably fixed to a guiding bed 19 by means of screws 20 the heads of which are arranged in recesses 21 (FIG. 5). The torsional rod 15 is rigidly fixed in the bearing block 18. The effective torsional rod length $l$ (FIG. 4) may be adjusted as desired by displacing the bearing block 18 on the guiding bed 19. For changing the effective lever length or eccentricity $e$ (FIG. 4) of the crankshaft 10, the torsional rod 15 may be drawn out of the bore 14 of the crankshaft pin 13 and the crankshaft 10 may be rotated by the desired angle, whereupon the torsional rod 15 is again introduced into the bore 14 of the crankshaft pin 13. It is also possible to displace the bearing block 18 so far to the left that it gets out of engagement with the toothing 17 of the torsional rod 15 so that the torsional rod 15 may be rotated together with the crankshaft 10 whereupon the bearing block 18 is pushed back into its original position.

The spring constant of the torsional rod 15 is changed by adjustment of the effective torsional rod length $l$. when $l$ is reduced by displacement of the bearing block 18 towards the right hand side the springing gets harder; when the bearing block 18 is displaced towards the left hand side and $l$ is increased the spring characteristics gets flatter and the springing — the torsional moment being equal — gets softer. By changing $l$ it is possible to change the natural frequency of the torque support or of the entire drive, respectively, and thus to eliminate critical frequencies. Since the torsional rod 15 is not pre-stressed, a shock-free spring support of the pinion carrier 4 is guaranteed.

The effective lever length or eccentricity $e$ of the crankshaft 10 is chosen so great that the sum total of all bearing friction moments in the torque support is not much smaller than the torsion moment induced by the linkage rod 7 and the crankshaft 10; when $e$ is chosen according to this, the spring action is sufficiently damped. $e$ or the torsion moment, respectively, may thus be adjusted between a maximum (which is a function of the dimension of the construction)—in which the plane of the throw of the crankshaft 10 is perpendicular to the axis of the linkage rod 7 — and a minimum — in which the throw plane lies in the linkage rod axis. If $e$ becomes zero or if $e$ gets so small that the sum total of all friction moments is greater than the torsion moment, the support is absolutely stiff, this adjustment is not desired, however, and is only mentioned for better understanding of the gist of invention.

By changing the effective torsional rod length $l$ and/or the effective lever length $e$ it is possible to adjust the torque support at any time to the operational conditions of the converter without having to carry out complicated re-buildings. A further advantage resides in that the torsional moment which is transferred onto the torsional rod 15 remains uninfluenced from the extent of the wobble movements of the tilting trunnion 1 and the pinion carrier 4, respectively; these wobble movements are accommodated by the linkage rod 7.

The torque support described in FIGS. 1 to 5 is also provided with a safety device becoming effective in case the torsional rod 15 breaks. Below the end of the linkage rod 7 which is provided with the ball joint bearing 9 a plate 22 is provided which is fixed to the foundation and arranged at a distance $h$ from the bottom side of the end of the linkage rod 7 (FIG. 4); the distance $h$ should be at least equal to the maximal effective lever length (eccentricity) $e$ but should not be greater than the value 2 $e$, the preferred value being 1.5 $e$. When the torsional rod breaks, the end of the linkage rod 7 hits upon the plate 22 so that a further rotation of the crankshaft may be prevented and the converter operation need not be interrupted immediately.

Also the embodiment of the torque support illustrated in FIGS. 6 and 7 is provided with all properties referred to above in relation to the change of $l$ and $e$. The linkage rod 7 arranged perpendicularly to the plane of the drawing and illustrated in like manner as the one shown in FIGS. 1 to 3, is connected at one end with the pinion carrier 4 and articulated with its other end to a bolt 25 (FIG. 6) by means of a ball joint bearing 24 which is arranged in its eye 23. The bolt 25 penetrates a yoke 26 which is rotatably arranged with its pins 27, 28 in bearing blocks 29, 30 and is connected via flange connections 31, 32 with torsional rods 33, 34 to be rigid against rotation. Numerals 35, 36 denote bearing blocks which are displaceable on the guiding beds 37, 38 for changing the effective torsional rod length *l*. Numeral 39 denotes adjusting screws which serve for fixing the torsional rods 33, 34 in the bearing blocks 35, 36 (FIG. 7). The bearing blocks are releasably fixed on guiding beds 37, 38 by means of screws 20, the heads of which are arranged in recesses 21. For adjusting the effective lever length or eccentricity *e* nuts 40 are provided which are screwed on the bolt 25 and coact with the ball joint bearing 24 by means of sleeves 41 so that by twisting the screw nuts 40 the bearing may be displaced along the bolt 25 (FIG. 6). The linkage rod 7 is secured to the ball joint bearing 24 by means of a ring 42 which comprises two parts. Numeral 43 denotes a releasable part of the yoke 26 which has to be removed when the assembly is mounted so that the bolt 25 together with the nuts 40, the sleeves 41 and the ball joint bearing 24 may be built in or out. The bolt 25 is fixed to the yoke 26 by the nuts 44.

Obviously the individual elements of the torque support may be combined and modified in any desired way according to the stress and the operationl conditions. For instance, it is easily possible to use a crank which is arranged only on one side in the bearing block 11 so that the bearing block 12 may be left away (FIG. 4). In the embodiment according to FIG. 6 it is possible to use only one torsional rod which may be designed similar as the torsional rod shown in FIG. 4 and may be connected with the pin 27 of the yoke 26 in like manner as is illustrated in the connection of the trsional rod 15 with the crankshaft pin 13. The crankshaft 10 may, on the other hand, be connected with two torsional rods.

What we claim is:

1. A tilting drive for converters comprising a gear wheel fixed to a converter tilting trunnion and a pinion carrier suspended on said tilting trunnion to swing in pendulum fashion and supporting at least one driving pinion, said pinion carrier being resiliently supported in relation to a foundation by a torque support including a linkage rod articulated with one end to said pinion carrier and with its other end to a member incorporating a lever producing a torsional moment, and a torsional rod positively connected with one end to said member incorporating said lever and fastened near its other end in relation to said foundation, the effective length of at least one of said torsional rod and said lever being adjustable.

2. The tilting drive set forth in claim 1, wherein said torsional rod is releasably fastened in a bearing block arranged to be axially displaceable in relation to said torsional rod.

3. The tilting drive set forth in claim 1, wherein the torsional rod is provided over at least part of its length with an external toothing allowing longitudinal displacement, a bearing block serving for fixing the torsional rod being provided with a corresponding internal toothing.

4. The tilting drive set forth in claim 1, wherein the torsional rod is provided at one end with a toothing for engagement with a corresponding toothing in a bore of a pin provided on the lever which connects the linkage rod and the torsional rod so that a connection may be formed which is rigid against rotation and may be released.

5. The tilting drive set forth in claim 1, wherein the lever connecting the linkage rod and the torsional rod forms part of a crankshaft which is connected with the linkage rod by a ball joint bearing.

6. The tilting drive set forth in claim 1, wherein the lever connecting the linkage rod and the torsional rod forms part of a crankshaft which is connected with the linkage rod by a ball joint bearing and that below the crankshaft, at a distance from the linkage rod, a supporting plate is provided, the distance being from as long to twice as long as the maximal effective lever length of the crankshfat.

7. The tilting drive set forth in claim 1, wherein the lever connecting the linkage rod and the torsional rod forms part of a yoke which is penetrated by a bolt on which a ball joint bearing is mounted which is connected with the linkage rod and displaceable in axial direction of the bolt, the plane laid through the yoke, the bolt and the torsional rod being perpendicular to the axis of the linkage rod.

8. The tilting drive set forth in claim 1, wherein the effective length of the lever connecting the linkage rod and the torsional rod is adjustable to such a value that the produced torsional moment is greater than the sum total of all bearing frictional moments in the torque support.

* * * * *